United States Patent Office 3,501,612
Patented Mar. 17, 1970

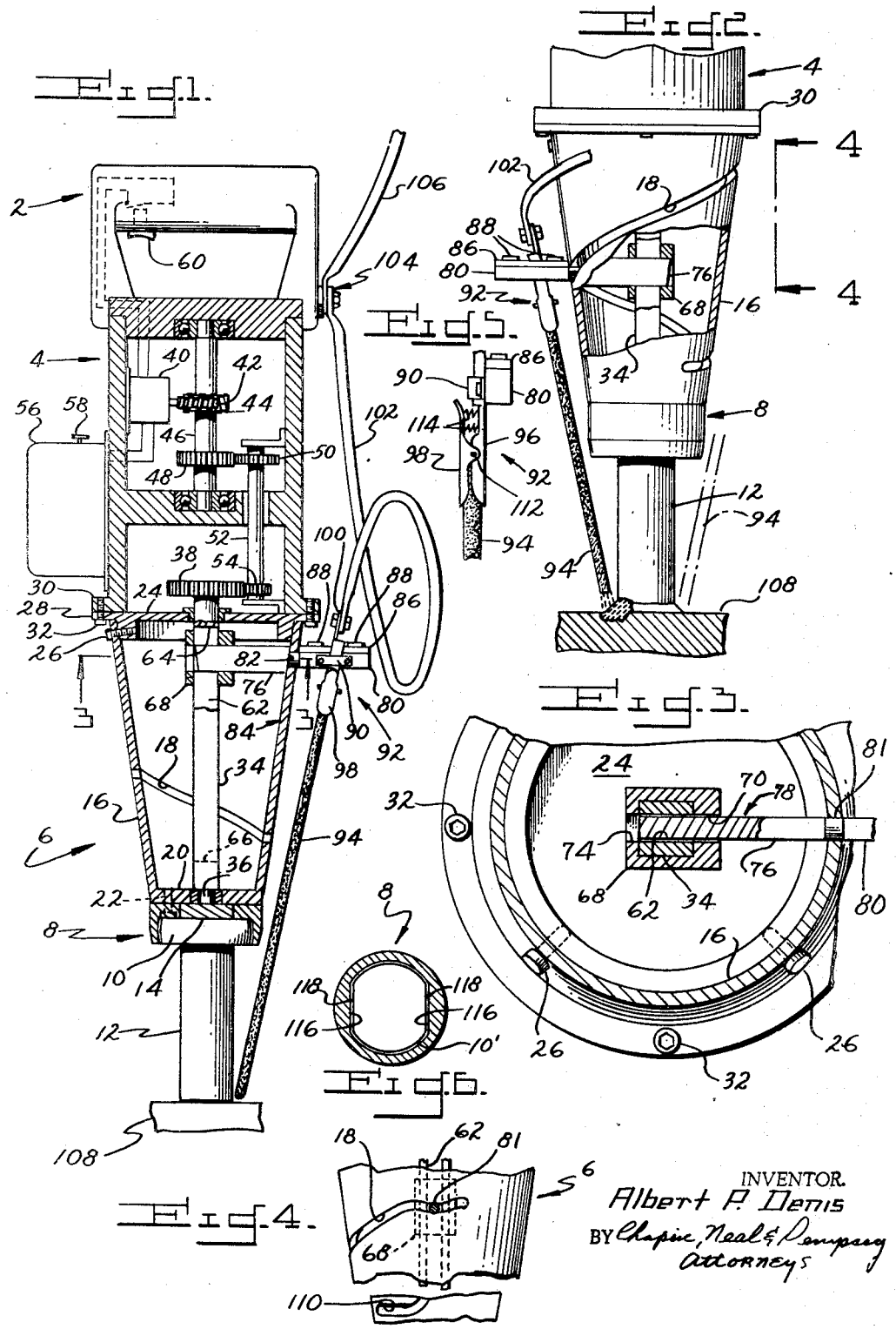

3,501,612
STUD WELDING DEVICE AND METHOD WITH ORBITAL WELD HEAD
Albert P. Denis, Castleton, N.Y., assignor to New Brunswick Scientific Co., Inc., New Brunswick, N.J., a corporation of New Jersey
Continuation-in-part of application Ser. No. 725,730, May 1, 1968. This application Apr. 29, 1969, Ser. No. 820,148
Int. Cl. B23k 9/12
U.S. Cl. 219—125                                       6 Claims

ABSTRACT OF THE DISCLOSURE

A method of arc welding a stud member to a workpiece by providing a conically arranged helix path above and about the axis of the base of the stud; holding a welding rod for movement along said path with the rod tip in arc welding relation to said base and workpiece; and advancing the rod along said path while maintaining the tip in said arc welding relation as the rod moves around said base. The portable tool has means at its outer end to hold the stud against a workpiece, an inverted frusto-conical housing with a helix slot through which a rod holder projects and positions a rod in angled relation to hold the tip end disposed in arc welding relation to the stud base, and a drive shaft connection in the housing to rotate the holder and move the rod in the helix slot for progressive rotary, downward, and inward movement to weld the stud in place.

This application is a continuation-in-part of application Ser. No. 725,730 filed May 1, 1968, for "Stud Welding Device."

BACKGROUND

This invention relates to a method of arc welding the base of a stud to a workpiece and to stud welding devices for practicing the method. The particular usefulness of the method and device is found in the welding by a hand portable tool of relatively large size studs having a diameter of 9/16 of an inch or greater and the welding thereof in relatively remote locations as, for example, fixing studs to steel beams forming the skeleton framework of a multi-story building, such studs being commonly used as fasteners for floor or ceiling "decking" plates supported by the steel beams as will be readily understood in the building construction trade.

Equipment generally now available for use in welding such studs in place of the so-called "gun-type." This type of tool is operated by connecting one side of a welding circuit temporarily to a workpiece on which the stud is to be welded, the other side of the circuit being connected to the gun. The gun mechanism commences an automatic cycle in which the stud is retracted from the workpiece and into a ferrule so as to create an arc between the end of the stud and workpiece. For a relatively short arcing period, which is preset by the gun mechanism, the free end of the stud and the workpiece are melted. The stud is then plunged into the molten pool so produced on the workpiece to make the weld. When the pool is congealed the gun is withdrawn leaving the stud attached.

Conventional stud guns now in commercial use are very fast and efficient in attaching studs of approximately ½ inch or less in diameter. However, it has been found that with studs of a greater diameter such welding methods do not produce a true union of the stud and workpiece metals. The attachment represents a more or less "tacking" operation. Experience has shown that when larger studs are applied by the guns a reliable weld does not take place and the work has failed to pass inspection and serviceability tests. An additional objection to the use of such conventional stud guns lies in the fact that special arc welding apparatus of 2,000 amperes or greater is required, together with a heavy duty control box. Furthermore, where studs are applied at locations remote from the generators as is generally the case in the above-mentioned building construction environment the voltage drop is generally quite severe and contributes to an inefficient operation with this type of aparatus.

In the device of the present invention a conventional 200 or 300 ampere welding machine may be used. Further, because of its operational design the present device produces an end result which is comparable to that which can be accomplished by an experienced man using hand welding equipment. Thus a true fusion of the stud metal and workpiece metal takes place. The result is a secure attachment of the stud as desired and intended and test requirements as to serviceability have been successively met with studs welded in place with a hand-made model of a tool employing the principles of operation as hereinafter disclosed.

An additional advantage of the present device, in contrast to the "gun-type" stud welding which results in the above-mentioned "tacked" attachment, lies in the fact that in operation it will compensate for poor welding conditions as when a workpiece is rusted, encrusted with paint, or where the condition of the metal is otherwise not in an ideal state for welding purposes. Furthermore, the present device is adapted to weld a stud directly to a steel beam workpiece or to operate so as to weld a stud thereto through the previously mentioned "decking" plates, the latter operation involving the simultaneous burning of a hole through the plates during the welding process of fusing the base of the stud to the beam.

The above and other advantages of the present invention will be appreciated from the following description of the method and an embodiment of the device as exemplified by the attached drawings.

In the drawings,
FIG. 1 is a vertical sectional view of a tool embodying the invention and showing parts thereof in a simplified schematic form;
FIG. 2 is a side elevation of the lower portion of the tool of FIG. 1, the housing being cut away and the parts positioned as at an intermediate state in a welding operation;
FIG. 3 is a section on line 3—3 of FIG. 1;
FIG. 4 shows details of the helix slot;
FIG. 5 shows details of the rod clamp; and
FIG. 6 shows an alternative feature of the stud head tool connection.

Referring to FIG. 1, the device is shown in somewhat schematic form as a portable tool having a hand grip handle 2 at the top fixed in any suitable manner at the upper end of a motor and gear drive casing 4. At the underside of the casing is fixed an inverted frusto-conical housing or head 6 provided at its lower end with a holder means 8 for releasably securing the head of a stud thereto as in a position of axial alignment with the housing axis.

The stud holder means 8 may be a flanged member forming a recess for receiving the head 10 of a stud 12. As shown a permanent magnet 14 may be recessed in the upper wall for removably fixing the stud axially of the tool. It will be appreciated that any other suitable form of chuck device for temporarily holding the stud at the end of the tool may be utilized.

The head 6 has a conically formed wall 16 in which a helix slot 18 is cut as will be later described. The stud fastening member 8 may be secured to the base 20 of the head as by screw bolts, one of which is indicated at 22. An upper cap member 24 is fastened at the top of the head as by screw bolts 26 and has a peripheral flange 28 provided for fastening by screw bolts 32 to the flanged base at 30 of the cylindrically formed gear housing 4, thus securing the casing and head together.

Extending axially of the head 6 is a drive shaft 34 having a reduced lower end 36 recessed in base 20 of the head for a bearing support. Shaft 34 extends through a bearing opening in the cap 24 and is fitted at its upper end with a spur gear 38 in a lower section of gear casing 4.

Shaft 34 is rotated by the gear 38 being driven through a speed reducing gear train fitted in housing 4 from a motor 40 mounted on the inner housing wall of the casing 4 in the upper section thereof. Motor 40 drives worm gear 42 meshing with a gear 44 on a shaft 46 in the upper section and provided with a spur gear 48. Gear 48 drives a gear 50 which is attached to shaft 52 and has a gear 54 at its lower end in mesh with gear 38. The reducing gear train is designed to drive shaft 34 at a suitable rate of speed for the welding operation as will be described below. Power for motor 40 may be supplied by batteries as in a battery casing 56 mounted on the outside of casing 4 and having a rheostat indicated at 58 to regulate the speed of rotation of shaft 34. A manually operated switch button 60 is shown on the handle 2 for actuating the motor.

Referring now to FIGS. 1 and 3, shaft 34 is square in cross-section and has a transverse through slot 62 extending longitudinally thereof. The upper and lower ends of the slot are indicated respectively at 64 and 66 (FIG. 1). Slidably mounted on shaft 34 is a slider block 68 having aligned slots 70 and 74 in opposite walls thereof, the slots being rectangularly shaped to receive the main body portion 76 of an electrode support 78 (FIG. 3) passing through slot 62 of the shaft.

Electrode support 78 is thus supported at right angles to the axis of shaft 34 by the slider block 68. At the outer end of the body portion 76 of the support is a reduced extension 80, the connection at 81 between the body and extension being cylindrically formed and supported in the helix slot 18. As indicated in FIG. 1 an outer face 82 of the body 76 is formed at an angle conforming to the angle of the inner wall surface at 84 of the tapered wall of the head. Fixed as on the upper surface of the support extension 80 is a support guide plate 86 which is secured thereto as by screws 88. The inner edge of guide 86 lies adjacent the outer surface of the wall 16. Accordingly, the cylindrical connection 81 engaged in the helix slot will cause the body portion 76 to slide transversely of the shaft 34 as the support moves from its upper position (FIG. 1) towards the lower end of the head as the shaft 34 rotates support 78.

Fixed on the side of the extension 80 as by the holding strap 90 is an electrode clamp 92 for holding an electrode or welding rod 94. The fixed jaw of clamp 92 is at 96, a spring pressed jaw being at 98 for releasably fastening a rod 94 in the angular direction as shown and generally following the inclined wall 16 of the housing 6. At the top of the fixed jaw is a connection at 100 for a lead 102 having an insulating lug connection at 104 to the handle of the tool, the lead wire 106 being connected to the arc welding equipment. The other side of the circuit is suitably connected, as will be understood, to a workpiece as indicated at 108 to which the stud is to be welded.

Movement of the rod as the end thereof burns off and produces the welding area around the base of the stud is determined by the speed of shaft 34, the pitch of the helix (or helix angle) and the angle of the cone. As will be obvious a marked change in stud diameter may require a change in the lead of the helix or a variation in the diameter of cone housing. In other words for the satisfactory welding of studs of various diameters, tools modified and designed for particular stud applications are necessary.

FIG. 2 shows a 180° angular displacement of the rod 94 from the rod position shown by FIG. 1 and the progressive welding as the rod burns off. The similarity of the welded area to that which would by produced by skilled manual welding will be apparent, a typical fillet produced by the union of metals being clearly indicated at the base of the stud. Referring to FIG. 4 the helix of slot 18 preferably extends through an angular distance of somewhat greater than 360°. At the top an upper initial slot portion may be provided for desired rod movement when starting the arc. As shown by FIG. 4 the cylindrical reduced portion at 81 is located in the slot at the bottom of an upper dipped portion so as to start the arc as will later be described. It is to be noted, however, that the dip in this initial portion may be considered optional and that it may be eliminated in the event a specially made "self-starting" rod is used. Such rods, as is known to those familiar in the art, have a tip end portion designed to quickly burn off and automatically establish a proper spaced relation to sustain the arc once it is started. At the lower end of the helix it will also be seen that a horizontally disposed terminal portion 110 is provided to continue movement of the rod beyond a 360° encircling of the stud. The terminal horizontal movement will result in further burn-off of the rod and a lengthening of the arc to break it and stop the flow of metal. Thus when holder 78 reaches the extreme end of the terminal portion 110 the welding action automatically shuts down. In practice an additional 8 to 15 degrees beyond the 360° turn is considered sufficient to break the arc. It will also be appreciated in connection with this terminal portion 110 and the described operation that provision may, of course, be otherwise made to shut off the arc as by suitable cut-off switch mechanism (not shown) tied into the circuit of lead wire 102 and triggered at the end of a completed shaft 34 rotation. It will be appreciated, also, that under special conditions a longer or double helix may be desirable in order to suit special working conditions.

In operation the tool having the helix slot as shown may be manually positioned to seat the base of a stud 12 against a workpiece 108 as indicated in FIG. 1. The welding rod 94, of a construction most suitable for the metals being welded, will be generally positioned relative to the base of the stud as indicated. With reference to FIG. 4, it will be noted that rod holder portion 81 is located at the top of the helix slot 18 in the lower portion of the dip. At the very beginning of shaft 34 movement the holder is seated against the extreme upper terminal end of the slot as to the right of portion 81 in FIG. 4. In its initial travel to the position of FIG. 4 the holder is lowered rather sharply to drop the rod at the start. Thus the rod tip may bottom to the base metal and start the welding arc. Once arcing is commenced further travel in the slot (as to the left in FIG. 4) elevates the rod slightly for a proper "running" position of the rod. After such upward movement portion 81 and the holder then follow the downwardly inclined helix path as shaft 34 turns. As previously noted and as will be apparent from the relative positions in FIG. 1 and FIG. 2, holder 78 also rides inwardly as the shaft 34 continues to rotate, the holder body 76 being supported for such inward movement as guided by slidable block 68 and the through slot 62 of shaft 34. As above outlined, the initial lowering of the rod by the dipped portion may be eliminated where a "self-starting" rod is used.

At the completion of a weld the tool is removed from the top of the stud, shaft 34 is reversely rotated to carry the holder to the top of the helix, and a new rod inserted in clamp 92. The motor 40 may be a standard reversible motor for returning the holder to its upper position and provision may be made for suitable limit switches (not shown) at each terminal end of the helix for automatic resetting. The clamp 92 may be of any suitable type. As exemplified by FIG. 5 the fixed jaw 96 carries a pivot 112 for the movable jaw 98 and is yieldably urged to grip the rod by springs at 114.

In FIG. 6 a modification of stud fastening means 8 is shown with the flanged sides thereof formed with a recess in which parallel faces at 116 receive complementary parallel faces 118 of a head 10'. A "locking" relationship between head and fastener is thus formed to prevent turning of the tool relative to a stud once a welding operation has commenced. It will be recognized that when a weld at the base of the stud is made along an arc of approximately 3 to 5 degrees the stud is integral with the work. Thus an operator cannot thereafter inadvertently twist or turn the tool relative to the head of the stud and either create a gap or overlap around the base of the stud. The locking feature may be used either with or without a permanent magnet such as illustrated by FIG. 1 as may be desired. Studs of different head configurations will, of course, determine the exact configuration and size of recess with the locking arrangement whereas the magnet alone may accommodate studs of similar diameter and length but of a variety of head sizes.

It will be seen from the above description of the exemplary stud welding tool as shown by the drawings and the operation thereof that a new method of welding the base of a stud to a workpiece has been disclosed in providing a conically arranged helix path and guided travel of the welding rod is advancing completely around the stud and progressively welding the base in a single uninterrupted pass. Thus in contrast to manual welding no particular concentrated attention is required by the operator with respect to maintaining a proper spacing of the electrode rod tip from the work. Nor is an operator required to interrupt the welding process to shift his position and proceed section by section in order to follow the welding visually for the full 360° travel. It will be seen, therefor, that with the new device studs may also be welded in place efficiently, as in close proximity against a wall where hand welding would otherwise be possible only by the "bind" welding of a section of the base.

As previously mentioned the device may be readily modified and operated to suit various and sundry conditions as in the fixing of a stud directly to a workpiece as a steel beam or the fixing of the stud to the beam through "decking" plate members while burning through the plates. In the latter instance it will be apparent that the rate of travel of the rod will of necessity be far slower in order to generate sufficient heat to melt through the decking plate metal and then to fuse with the metal of the underlying beam and form a true union in the welded areas. This type of variation in operation and additional considerations consistent with the particular needs of given installations and its environment will readily be evident to one skilled in the art of stud welding and the welding of metals generally.

What is claimed is:

1. A stud welding tool for use with arc welding equipment comprising
   a head having means at one end for removably holding a stud with its base in extended position,
   a welding rod holder mounted transversely of the axis of the head and having rod engaging means spaced from said axis for gripping one end of a rod and longitudinally directing the same in inwardly angled relation and placing the free end thereof adjacent the base of a stud fixed on said end of the head,
   mechanism for moving said rod holder longitudinally of the axis of the stud holder including
   a shaft rotatable on the axis of said head drivingly connected with said rod holder for rotation and guided support of the latter when moved transversely of the head axis, and
   rod holder engaging means, operative on rotation of the rod holder, to simultaneously move the rod holder towards said one end of the head and inwardly of the head axis, and
   means for coupling said rod engaging means to arc welding equipment.

2. A stud welding tool as in claim 1 in which
   said head includes an inverted frusto-conical housing inwardly adjacent said stud holding means, a helix slot is formed in the wall of said housing and constitutes said radially spaced rod holder engaging means in which a portion of said rod holder is slidably received inwardly of said rod engaging means, and
   said rod holder is slidably interconnected with said rotatable shaft for rotation thereby and movement axially thereof, and
   supporting means are slidably mounted on said shaft to maintain said transverse relation of said rod holder.

3. A stud welding tool as in claim 2 in which
   said rotatable shaft is non-circular in cross section and is provided with a longitudinal through slot,
   said supporting means is a block having a bore slidably fitted on said shaft and slotted openings in opposite walls thereof forming with said shaft slot a passage for receiving and supporting said rod holder for the transverse movement thereof.

4. A stud welding tool as in claim 3 in which
   the helix slot extends around said housing wall and describes a continous path of at least 360°, and
   a lower end portion is provided at the end of the helix forming a short flattened terminal section.

5. The method of welding a stud member to a workpiece by
   placing the base of the stud against a workpiece in the relative position desired for attachment thereto,
   providing a path coaxial with the axis of said stud base starting at a location spaced outwardly thereof and progressively approaching both said stud base and the axis thereof and describing a helix,
   and advancing a welding rod electrode along said helix path so that the tip end thereof remains in arc welding relation to the metal of said stud base and workpiece.

6. The method of arc welding a stud member to a workpiece which comprises the steps of
   assembling the base of the stud and the workpiece in the relative position desired for attachment thereto,
   providing a conically arranged helix path in co-axial relation to the axis of the stud base and in outwardly spaced relation thereto,
   applying the tip of a welding rod in arc welding relation to the stud base metal and adjacent workpiece metal,
   advancing said rod along said helix path while maintaining the tip thereof in said arc welding relation as the rod encircles the stud.

References Cited

UNITED STATES PATENTS

| | | | |
|---|---|---|---|
| 1,949,251 | 2/1934 | Gilbert | 219—125 |
| 2,930,883 | 3/1960 | Adamec et al. | 219—125 |
| 3,215,812 | 11/1965 | Smith | 219—125 |

FOREIGN PATENTS

| | | |
|---|---|---|
| 33,122 | 5/1965 | Germany. |

JOSEPH V. TRUE, Primary Examiner

L. A. SCHUTZMAN, Assistant Examiner

U.S. Cl. X.R.

219—98, 99

PO-1050
(5/69)

UNITED STATES PATENT OFFICE
CERTIFICATE OF CORRECTION

Patent No. 3,501,612     Dated March 17, 1970

Inventor(s) ALBERT P. DENIS

It is certified that error appears in the above-identified patent and that said Letters Patent are hereby corrected as shown below:

In the heading, delete the Assignee. The Grant Issuance of the patent is to the INVENTOR, as sole owner.

SIGNED AND SEALED

JUN 16 1970

(SEAL)
Attest:

Edward M. Fletcher, Jr.
Attesting Officer

WILLIAM E. SCHUYLER, JR.
Commissioner of Patents